United States Patent
Nagy et al.

[11] Patent Number: 6,086,037
[45] Date of Patent: Jul. 11, 2000

[54] MOLD FOR ASSEMBLING AND FORMING WIRE HARNESS

[75] Inventors: Steve M. Nagy, Grosse Isle; Timothy F. O'Brien, White Lake; Joseph J. Davis, Jr., Ortonville, all of Mich.; Cal A. Lilienthal, Iowa City, Iowa

[73] Assignee: Lear Automotive Dearborn, Inc, Southfield, Mich.

[21] Appl. No.: 08/919,946

[22] Filed: Aug. 29, 1997

[51] Int. Cl.[7] .................................................. B22D 19/00
[52] U.S. Cl. ........................... 249/91; 249/164; 425/116; 425/123; 425/449
[58] Field of Search ................................ 249/91, 134, 85; 425/116, DIG. 44, 123, 449; 264/309, 278, 313, 318

[56] References Cited

U.S. PATENT DOCUMENTS

| | | | |
|---|---|---|---|
| 2,264,003 | 11/1941 | Osenberg | 264/309 |
| 3,705,228 | 12/1972 | Mattingly | 264/309 |
| 3,768,155 | 10/1973 | Bonfiglio et al. | 264/313 |
| 3,856,908 | 12/1974 | Harper | 264/313 |
| 3,946,768 | 3/1976 | Fiorentino . | |
| 3,985,951 | 10/1976 | Harris . | |
| 4,239,564 | 12/1980 | Krumweide | 264/46.5 |
| 4,270,961 | 6/1981 | Faranetta et al. . | |
| 4,444,705 | 4/1984 | Kumasaka et al. . | |
| 4,472,451 | 9/1984 | Mulder | 427/28 |
| 4,653,155 | 3/1987 | Hara . | |
| 4,799,873 | 1/1989 | Martin | 425/73 |
| 4,811,439 | 3/1989 | Siegel et al. | 264/46.4 |
| 4,923,537 | 5/1990 | Matsushima . | |
| 5,030,116 | 7/1991 | Sakai et al. . | |
| 5,082,253 | 1/1992 | Suzuki et al. . | |
| 5,168,124 | 12/1992 | Takase et al. . | |
| 5,182,032 | 1/1993 | Dickie et al. | 264/275 |
| 5,230,146 | 7/1993 | Tsuji et al. . | |
| 5,338,014 | 8/1994 | Kitamura . | |
| 5,490,664 | 2/1996 | Justus et al. . | |
| 5,500,179 | 3/1996 | Onishi et al. . | |
| 5,535,511 | 7/1996 | Karasik . | |
| 5,560,884 | 10/1996 | Ysbrand | 425/123 |
| 5,598,627 | 2/1997 | Saka et al. . | |
| 5,620,711 | 4/1997 | Saito | 264/275 |
| 5,639,416 | 6/1997 | Pennisi et al. | 264/318 |
| 5,683,796 | 11/1997 | Kornylo et al. | 156/78 |

FOREIGN PATENT DOCUMENTS 0235924  1/1987  European Pat. Off. .

Primary Examiner—Allan R. Kuhns
Attorney, Agent, or Firm—MacMillan, Sobanski & Todd, LLC

[57] ABSTRACT

A mold for assembling and forming a wire harness preferably includes wire supports extending into a continuous trough which forms a main trunk and a plurality of branches extending from the main trunk. A port introduces a generally liquid sheath material into the trough of the mold. Wires are routed on the wire supports along the main trunk and branches of the trough in the mold. The sheath material is then introduced into the mold and cures around and among the plurality of wires.

13 Claims, 4 Drawing Sheets

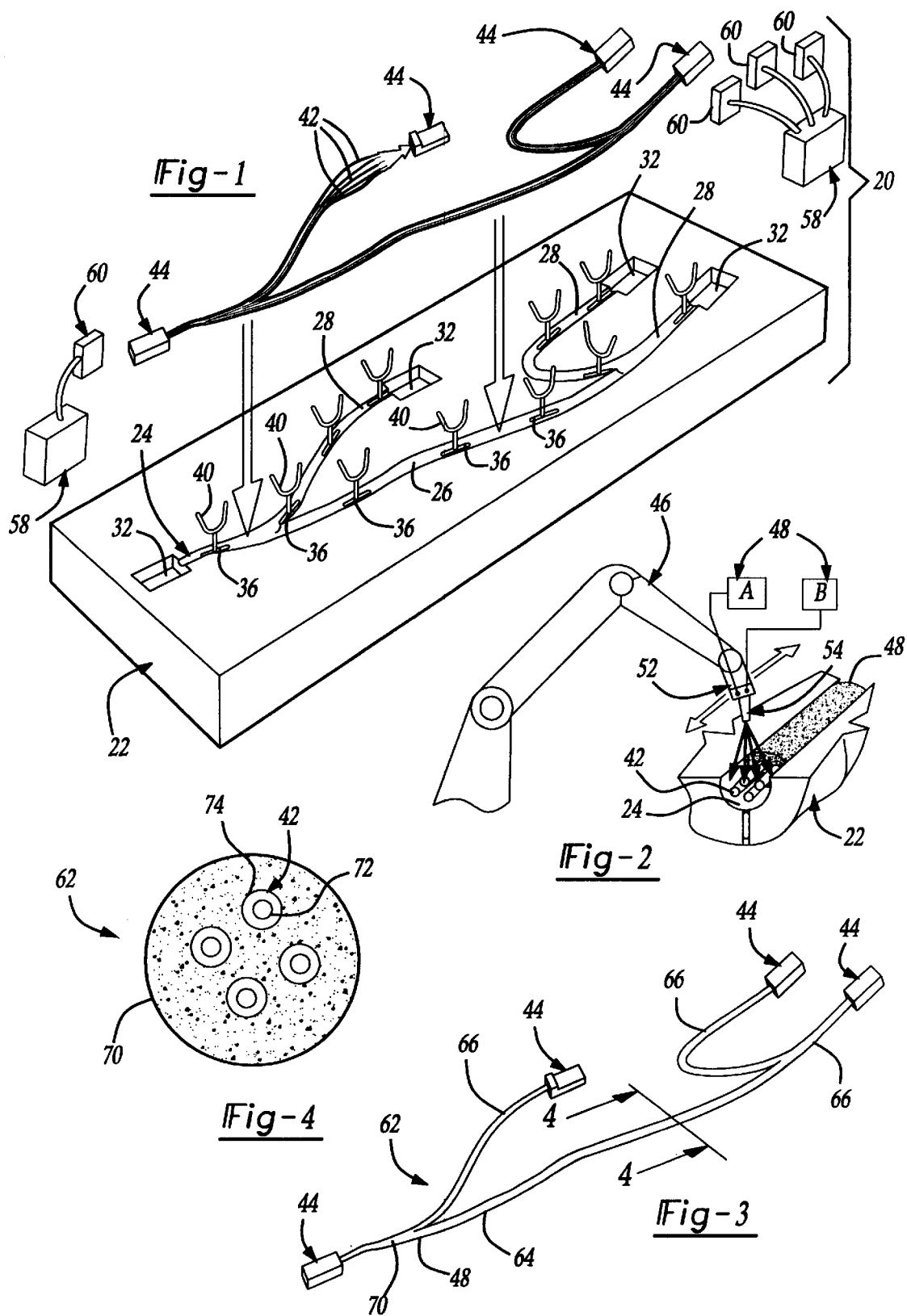

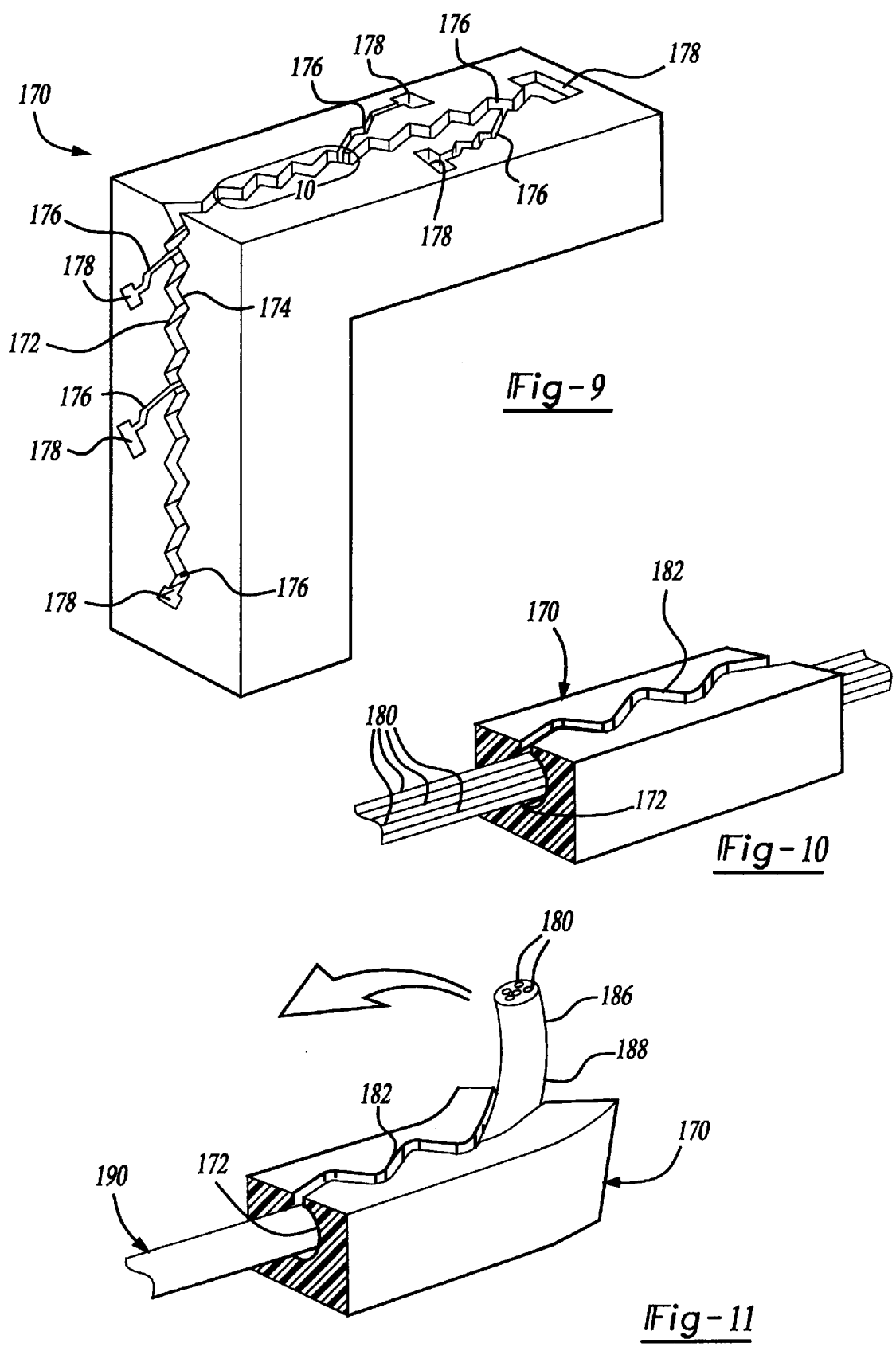

MOLD FOR ASSEMBLING AND FORMING WIRE HARNESS

BACKGROUND OF THE INVENTION

The present invention relates to wire harnesses and more particularly to a method and mold for assembling and forming a wire harness.

Current vehicles include numerous wire harnesses interconnecting an increasing number of electrical components to user-activated and computer-controlled switches and sensors. Each wire harness comprises a plurality of wires which are bundled to form a main trunk and a plurality of branches extending from the trunk. Typically, each of the branches includes an electrical connector at an outer end.

During assembly of wire harnesses, the wire bundles are held together in an assembly jig, which includes a plurality of wire supports supporting the wires along each of the main trunk and each of the branches. Each wire is placed into the assembly jig onto the appropriate wire supports, i.e. from a first branch at one end of the wire harness, through the main trunk and through a second branch, typically at an opposite end of the wire harness. Electrical connectors are then connected to the outer ends of the wires at the branches. The wires are then wrapped with tape along the entire length of the main trunk and each of the branches.

Plastic tubes or sleeves are often secured around the bundled wires in selected locations to protect against mechanical wear caused by vibration. Foam sheets are often wrapped and taped about the bundles in selected areas to provide damping and reduce noise. Fasteners, such as christmas tree connectors, are secured to the bundled wires with the wrapped tape. Rubber gaskets are secured to selected portions of the bundled wires in order to provide water seals at selected locations. Branch identifiers, such as tape labels are often wrapped about the branches near the connectors in order to identify the branch so it is properly mounted and connected.

United Technologies Automotive has developed a new wire harness in which the wires are encased in a molded foam sheath. This is described in more detail in co-pending application U.S. Ser. No. 08/898,663, filed on Jul. 22, 1997 entitled "FOAMED-IN WIRE HARNESSES." Improvements are more fully disclosed in other co-pending applications: "WIRE HARNESS WITH INTEGRAL CONNECTOR" filed on Aug. 29, 1997 and assigned U.S. Ser. No. 08/920,768; "APPARATUS FOR CENTERING WIRE HARNESS IN MOLD" filed on Aug. 29, 1998 and assigned U.S. Ser. No. 08/920,458; "WIRE HARNESS WITH SPLICE LOCATORS" filed on Aug. 29, 1998 and assigned U.S. Ser. No. ; "METHOD AND APPARATUS FOR SECURING WIRE HARNESS TO SURFACE" filed on and assigned U.S. Ser. No. 08/920,978; "MULTISHOT MOLDS FOR MANUFACTURING WIRE HARNESS" filed on Aug. 29, 1997 and assigned U.S. Ser. No. 08/920,857; "FOAM WIRE HARNESS WITH SHAPE MEMORY" filed on Aug. 29, 1997 and assigned U.S. Ser. No. 08/920,570.

The development of this technology has led to additional challenges and benefits. For example, for large wire harnesses with many branches, it is difficult and time consuming to move the assembled wire harness to the mold for molding the foam sheath about the bundled wires.

SUMMARY OF THE INVENTION

The present invention provides a mold for assembling a wire harness and subsequently forming a sheath around the wire harness.

A mold for assembling and forming the wire harness preferably includes a continuous trough which forms a main trunk branching into a plurality of branches continuous with the main trunk. A plurality of wire supports extending into the trough. A port introduces a generally liquid sheath material into the trough of the mold.

Preferably, the wire supports are retractable into apertures in the trough of the mold. Further, a spray head may include the port for spraying the sheath material into the trough. The spray head is preferably mounted on a moveable robot which follows the length of the trough and each of its branches.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 1 is a perspective view of a mold for making a wire harness according to the present invention;

FIG. 2 illustrates a robot spraying a polymer into the mold of FIG. 1;

FIG. 3 is a wire harness manufactured in the mold of FIG. 1;

FIG. 4 is a sectional view through the wire harness of FIG. 3 taken along line 4—4;

FIG. 9 is a perspective view of a fourth alternate mold for making a wire harness according to the present invention;

FIG. 10 is a perspective view of a section of the mold of FIG. 9; and

FIG. 11 is the mold of FIG. 10 during removal of a molded wire harness.

DETAILED DESCRIPTION OF THE PREFERRED EMBODIMENTS

Figure 5:
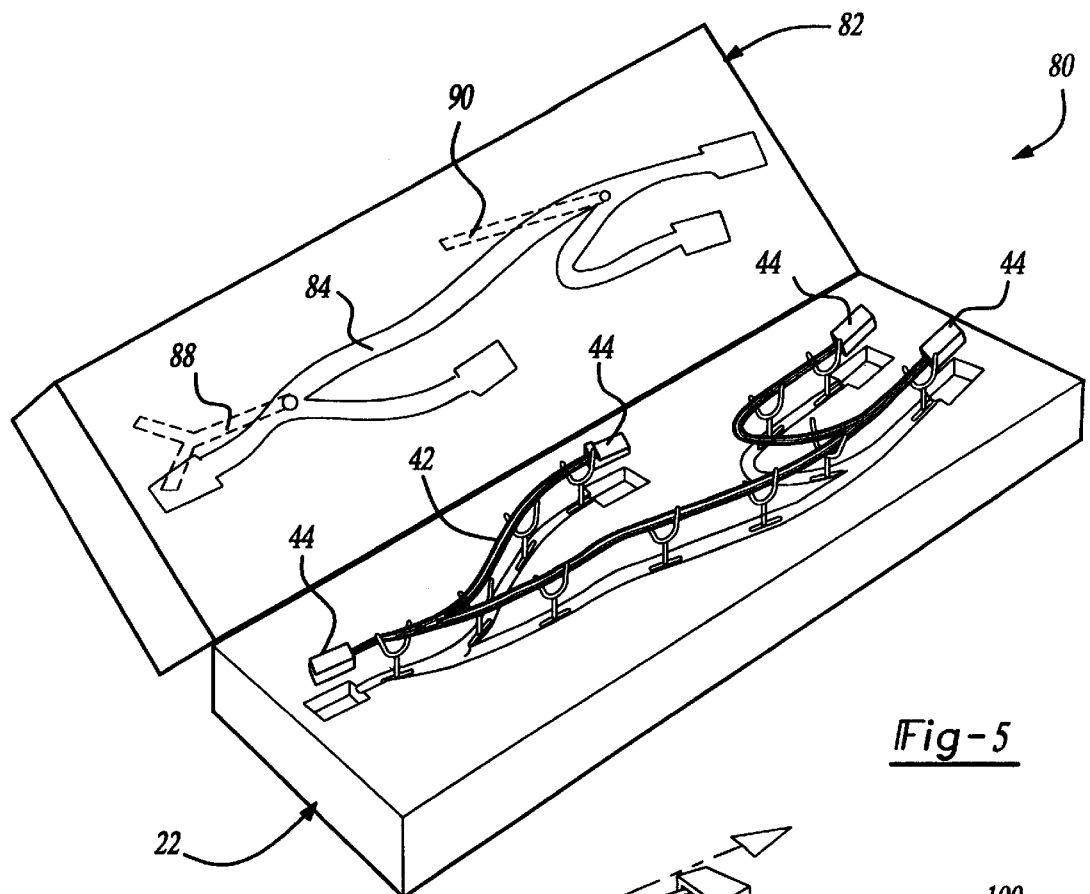
FIG. 5 is a first alternate mold for making a wire harness according to the present invention.

FIG. 1 shows apparatus 20 for manufacturing a wire harness according to the present invention. A mold 22 includes a concave, continuous trough 24 comprising a main trunk 26 branching into a plurality of branches 28, continuous with the main trunk 26. The mold 22 further includes recesses 32 adjacent the ends of the branches 28. A plurality of apertures 36 extend into the trough 24 from the mold 22. A fork shaped wire support 40 is preferably disposed in each aperture 36 and is preferably selectively retractable into the mold 22.

Wires 42 are sequentially routed along the trough 24 on wire supports 40. Each wire extends from one branch 28 through the main trunk 26 to another branch 28. The routing of each wire 42 will be determined by the specific application. An electrical connector 44 is then electrically connected to each end of the wires 42. One or more wires 42 are connected to each electrical connector 44. When all of the wires 42 are routed and connected to the electrical connector 44, an electrical check 58 having connectors 60 complementary to each of the connectors 44 electrically checks all of the connections and the routing of the wires 42. If the electrical check 58 determines that the wires 42 have been routed and connected correctly, the wire supports 40 are retracted into apertures 36, thereby lowering the bundled wires 42 into the trough 24 as shown in FIG. 2.

Referring to FIG. 2, a spray head 52 having a nozzle 54, or spray port, is mounted on an outer end of a robot arm 46. The spray head 52 sprays a polymer 48, such as foam and preferably Elastoflex™, available from BASF. The polymer 48 is preferably a two part polymer 48 supplied to the spray head 52. After the wires 42 are lowered into trough 24, spray head 52 sprays the polymer along the trough 24. Robot arm 46 moves the spray head 52 along the trough 24 including the main trunk 26 and each of the branches 28.

The wire harness 62 is then removed from mold 22. The wire harness 62 is shown in FIG. 3. The wire harness 62 includes a main trunk 64 leading to a plurality of branches 66. An electrical connector 44 is secured to the outer end of each branch 66. The cured polymer 48 forms a continuous sheath 70 continuously over main trunk 64 and all of the branches 66. Preferably, the sheath 70 abuts the ends of the electrical connectors 44 to form a seal.

FIG. 4 is a sectional view through the wire harness 62. Each wire 42 generally comprises a conductor 72 surrounded by an insulator 74. The sheath 70 is molded around and among the wires 42.

Manufacturing time and costs are reduced by the fact that the mold 22 is also used as the assembly jig for the wire harness 62. There is no need to spot tape the wires 42 after assembly prior to molding and no need to handle a large bundle of wires 42, which may have numerous branches 66 which would otherwise have to be located in each of the branches 28 of the trough 24.

An alternate apparatus 80 for manufacturing a wire harness is shown in FIG. 5 including the mold 22 of FIG. 1. The alternate apparatus 80 further includes an upper mold 82 generally having a trough 84 which is complementary to the trough 24 of mold 22. The supply ports 88 for introducing the polymer 48 into the trough 24, 84 are provided in the upper mold 82. Further, an excess port 90, for removing the excess polymer 48 is also provided in upper mold 82. Again, the wires 42 are preferably routed, connected to the electrical connectors 44, and electrically checked on the mold 22 prior to molding. This eliminates the need to assemble the wires 42 at an assembly jig, spot tape the wires 42 together at selected points and then move the spot taped wire harness to a mold for molding the sheath.

Figure 6:
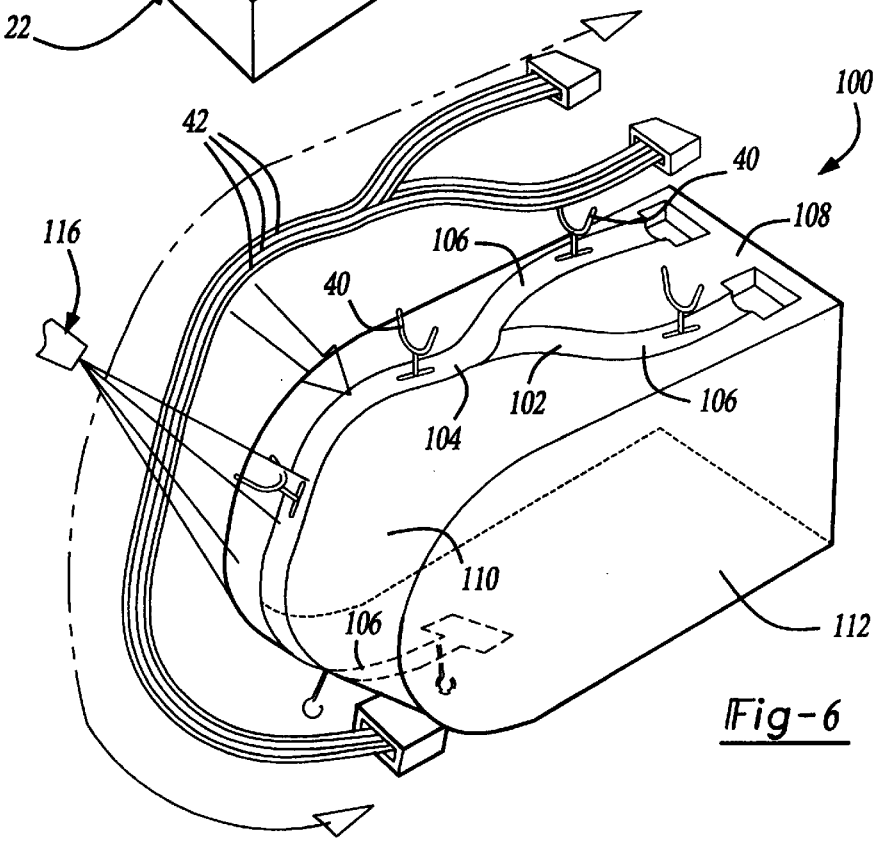
FIG. 6 is a second alternate mold for making a wire harness according to the present invention.

A three dimensional open mold 100 is shown in FIG. 6 including a trough 102 having a main trunk 104 and a plurality of branches 106. The trough 102 is generally concave along a first surface 108 which is generally horizontal on the mold 100. The trough 102 is continuous along a second surface 110 which curves about an axis parallel to the first surface 108, becoming generally vertical at one point and continuing to a third surface 112 generally parallel to and spaced from a first surface 108. The trough 102 on the third surface 112 opens in a direction which is generally opposite the first surface 108. A spray head 116, which could be identical to that shown in FIG. 1 is mounted on the end of a robot arm (not shown).

In operation, the wires 42 are preferably routed on the mold 100 prior to molding. An electrical check (not shown) preferably checks the routing and connections of the wires 42. The wire supports 40 are then retracted, bringing the wires 42 into the trough 102. The robot arm 120 then moves the spray head 116 along the trough 102 while the spray head 116 is spraying the generally liquid, although fairly viscous, polymer 48 along the trough 102. Preferably the robot arm 120 moves the spray head 116 along the trough 102 along first surface 108, second surface 110 and third surface 112. The spray head 116 may spray a polymer 48 which is sufficiently viscous and adhering to spray on the second surface 110 vertically and the third surface 112 which opens downwardly. Alternatively, the mold 100 can be rotated during the spraying of the polymer 48 such that the trough 102 on the first surface 108 is first sprayed, then the mold 100 is rotated such that the second surface 110 is generally horizontal, at which time the polymer 48 is sprayed in the trough 102 on the second surface 110. The mold 100 then continues to rotate such that the third surface 112 is generally horizontal while the first surface 108 opens generally downwardly, but is cured sufficiently to remain in mold 100. Generally, at the point the spray head 116 is spraying the polymer 48 into the trough 102, that point in the trough is generally horizontal relative to gravity. The three dimensional mold 100 can produce a wire harness having shape memory such that the branches would tend to the same positions as when installed.

Figure 7:
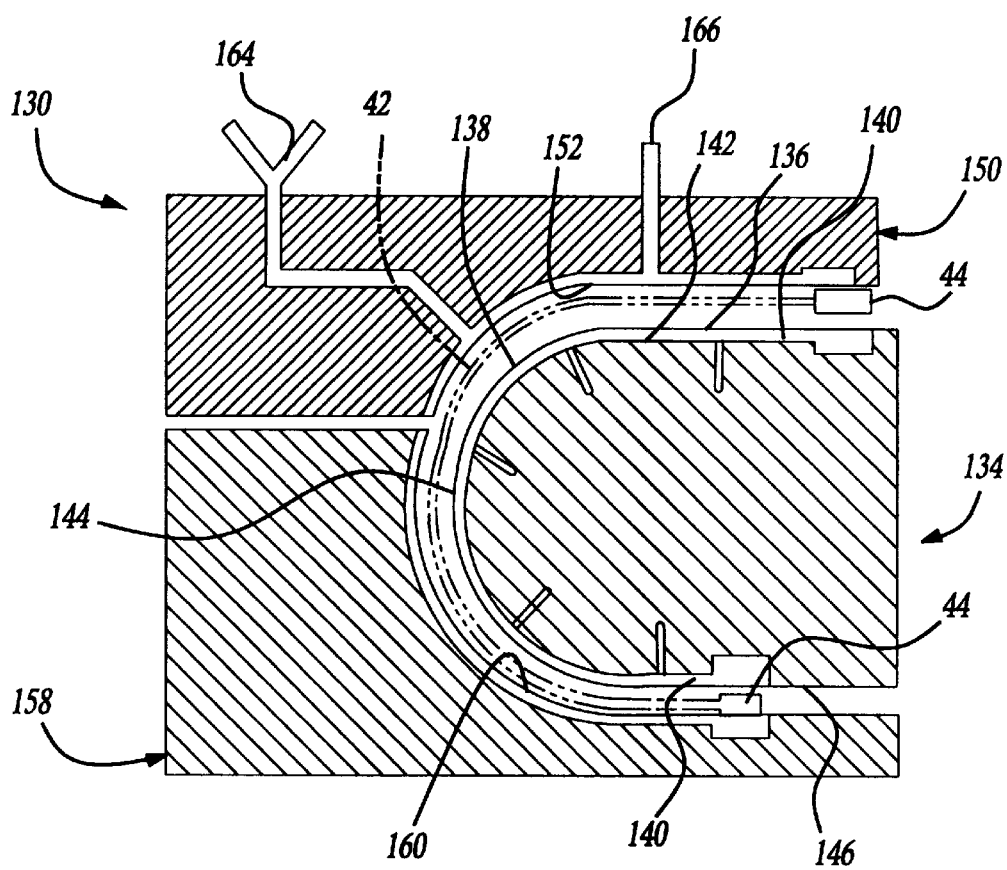
FIG. 7 is a third alternate mold for making a wire harness according to the present invention.

An alternate mold 130 for creating a 3-D wire harness is shown in FIG. 7. The mold 130 generally comprises a base mold 134 having a trough 136 having a main trunk 138 branching into a plurality of continuous branches 140. The trough 136 extends along a first surface 142 which is generally horizontal, onto a second surface 144 which is generally curved and leads to a third surface 146 which is generally parallel to the first surface 142. The trough 136 on the third surface 146 is generally parallel to and spaced from the first surface 142. An upper mold 150 includes a trough 152 which is complementary to the main trunk 138 and a plurality of the branches 140 of the trough 136 in the base mold 134. A lower mold 158 includes a trough 160 which is complementary to one of the branches 140 of the trough 136 of the base mold 134. A supply port 164 and excess port 166 supply and remove polymer 48 to the mold 130. An electrical check (not shown) preferably checks the routing and connection of the wires 42 prior to molding.

A wire harness 167 molded in the mold 130 of FIG. 7 has a three dimensional shape. Preferably, the shape of the wire harness 167 would match the contour of the surface to which the wire harness 167 is secured, thereby easing installation, as the branches would tend to be oriented in the correct directions. Further, the shape memory would reduce the number of connectors required to keep the wire harness 167 in place and reduce any noise caused by the wire harness 167. This shape memory feature is described and claimed more particularly in co-pending application U.S. Ser. No. 08/898,663 filed on Jul. 22, 1997, the assignee of which is the assignee of the present invention.

Another three dimensional mold 170 is shown in FIG. 9. The mold 170 is made of a flexible material, such as silicone and includes an elongated channel 172 having a main trunk 174 and a plurality of branches 176. A recess 178 for receiving an electrical connector is formed at the outer end of each branch 176.

Figure 8:
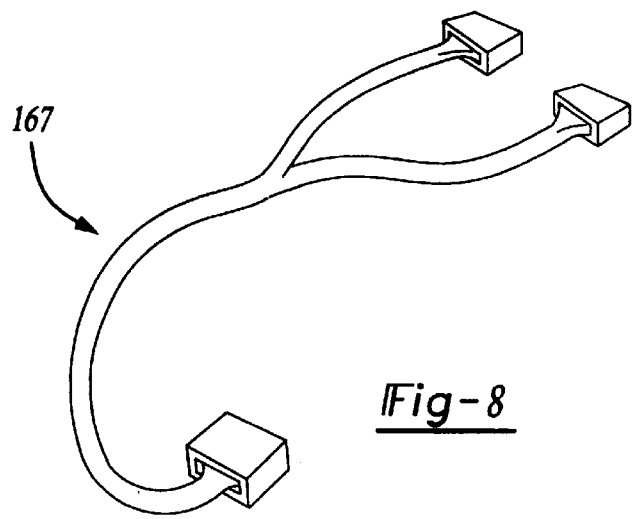
FIG. 8 is a wire harness manufactured in the mold of FIG. 7.

FIG. 10 shows an enlarged view, partially broken away, of a section of the mold 170. During operation, a plurality of wires 180 are inserted into the channel 172 of the mold 170. As can be seen in FIG. 8, the channel 172 includes a wavy, or roughly sinusoidal, opening 182 leading into channel 172. Since the mold 170 and the wires 180 are flexible, the wires 180 can be inserted into the channel 172 through the opening 182. Each wire 180 is routed to the appropriate branch 176 and connected to an electrical connector (not shown). The wires 180 may be routed one at a time into the mold 170 or bundled before insertion into the opening 182. After the wires 180 are routed in the mold 170, an electrical check (not shown) preferably checks the routing and connection of the wires 180. If the wires 180 are routed and connected correctly, a polymer foam, again preferably Elastoflex™, available from BASF, is introduced into the channel 172 of the mold 170, encasing wires 180. Although the mold 170 is flexible, it is sufficiently rigid to retain the foam until it sets.

As can be seen in FIG. 11, when the foam 186 sets, it forms a continuous, molded sheath 188 around and among the wires 180, thereby forming a wire harness 190. The wire harness 190 can be removed from the mold 170 simply by grasping one end of the wire harness 190 and pulling it from the mold 170. Because the mold 170 is flexible, the opening 182 is expanded by pulling wire harness 190 from the mold 170. The flexible mold 170 is simple, requires no moving parts and can be used to mold three dimensional wire harness shapes.

In accordance with the provisions of the patent statutes and jurisprudence, exemplary configurations described above are considered to represent the preferred embodiments of the invention. However, it should be noted that the invention can be practiced otherwise than as specifically illustrated and described without departing from its spirit or scope.

What is claimed is:

1. An apparatus for assembling a wire harness comprising:
   a mold having a trough including a main trough and a plurality of branch troughs continuous with said main trough;
   at least one wire support extending into each of said main trough and said plurality of branch troughs, said wire support formed separately from said mold; and
   a port for introducing a generally liquid sheath material into said trough, including said main trough and said plurality of branch troughs.

2. The apparatus according to claim 1 wherein said supports are selectively retractable.

3. The apparatus according to claim 2 wherein said mold includes at least one aperture leading to said trough, said wire support extending into said trough through said aperture, said wire support selectively retractable into said apertures out of said trough.

4. The apparatus according to claim 1 wherein each said wire support is a fork extending into said trough.

5. The apparatus according to claim 1 wherein said mold includes a lower mold having said trough and an upper mold having a complementary trough.

6. The apparatus according to claim 1 wherein said mold includes a first mold having a main trough and first and second branch troughs continuous with said main trough, a second mold having troughs complementary to a first portion of said main trough and said first branch trough, and a third mold having troughs complementary to a second portion of said main trough and said second trough.

7. An apparatus for assembling a wire harness comprising:
   a mold having a trough including a main trough and a plurality of branch troughs continuous with said main trough;
   at least one wire support for supporting a plurality of wires in said trough; and
   a spray head movable relative to said mold to spray a polymer along a length of said trough, said spray head capable of spraying said polymer into each of said branch troughs.

8. The apparatus according to claim 7 wherein said trough includes a first portion in a generally horizontal first plane and a second portion in a generally vertical second plane.

9. The apparatus according to claim 7 wherein said trough includes a first portion in a generally horizontal first plane and a second portion in a second plane generally parallel to and spaced from said first plane.

10. The apparatus according to claim 9 wherein said first portion opens in a first direction, said second portion opening in a second direction substantially opposite said first direction.

11. An apparatus for assembling a wire harness comprising:
    a mold having a trough, said trough including a main trunk and a plurality of branches, each of said plurality of branches terminating in a recess, said mold having an opening leading to said trough which when undeformed is narrower than the trough; and
    a port for introducing a generally liquid sheath material into said trough;
    said mold being sufficiently flexible to permit removal of the cured material from said trough through said opening.

12. The apparatus of claim 11 wherein said mold comprises silicone.

13. The apparatus of claim 11 wherein said opening is wavy.

* * * * *